US011481684B2

(12) United States Patent
Miserendino et al.

(10) Patent No.: US 11,481,684 B2
(45) Date of Patent: *Oct. 25, 2022

(54) SYSTEM AND METHOD FOR MACHINE LEARNING MODEL DETERMINATION AND MALWARE IDENTIFICATION

(71) Applicant: BLUVECTOR, INC., Philadelphia, PA (US)

(72) Inventors: Scott B. Miserendino, Baltimore, MD (US); Robert H. Klein, Silver Spring, MD (US); Ryan V. Peters, Fairfax, VA (US); Peter E. Kaloroumakis, Bowie, MD (US)

(73) Assignee: BLUVECTOR, INC., Philadelphia, PA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/916,049

(22) Filed: Jun. 29, 2020

(65) Prior Publication Data

US 2020/0401941 A1 Dec. 24, 2020

Related U.S. Application Data

(63) Continuation of application No. 16/180,790, filed on Nov. 5, 2018, now Pat. No. 10,733,539, which is a (Continued)

(51) Int. Cl.
*G06F 21/00* (2013.01)
*G06N 20/00* (2019.01)
(Continued)

(52) U.S. Cl.
CPC ........... *G06N 20/00* (2019.01); *G06F 21/566* (2013.01); *G06N 5/04* (2013.01); *H04W 12/128* (2021.01);
(Continued)

(58) Field of Classification Search
CPC ....... G06N 99/00; G06N 5/04; H04W 12/128; G06F 21/566; G06F 11/3006; G06F 2221/033; H04L 63/1433
See application file for complete search history.

(56) References Cited

U.S. PATENT DOCUMENTS 6,513,025 B1 1/2003 Rosen
8,161,548 B1 * 4/2012 Wan ...................... G06F 21/566
713/188

(Continued)

FOREIGN PATENT DOCUMENTS

EP 2723034 A1 4/2014
EP 2646911 B1 4/2018
(Continued)

OTHER PUBLICATIONS

Extended European Search Report for Application No. 16833453.0 (PCT/US2016/036408) dated Jan. 4, 2019, 12 pages.

(Continued)

*Primary Examiner* — Ghodrat Jamshidi
(74) *Attorney, Agent, or Firm* — BakerHostetler

(57) ABSTRACT

A system and method for batched, supervised, in-situ machine learning classifier retraining for malware identification and model heterogeneity. The method produces a parent classifier model in one location and providing it to one or more in-situ retraining system or systems in a different location or locations, adjudicates the class determination of the parent classifier over the plurality of the samples evaluated by the in-situ retraining system or systems, determines a minimum number of adjudicated samples required to initiate the in-situ retraining process, creates a new training and test set using samples from one or more in-situ systems, blends a feature vector representation of the in-situ training and test sets with a feature vector representation of the parent training and test sets, conducts machine (Continued)

learning over the blended training set, evaluates the new and parent models using the blended test set and additional unlabeled samples, and elects whether to replace the parent classifier with the retrained version.

28 Claims, 5 Drawing Sheets

Related U.S. Application Data continuation of application No. 15/176,784, filed on Jun. 8, 2016, now Pat. No. 10,121,108.

(60) Provisional application No. 62/199,390, filed on Jul. 31, 2015.

(51) Int. Cl.
 *G06N 5/04* (2006.01)
 *G06F 21/56* (2013.01)
 *H04W 12/128* (2021.01)
 *G06F 11/30* (2006.01)
 *H04L 9/40* (2022.01)

(52) U.S. Cl.
 CPC .... *G06F 11/3006* (2013.01); *G06F 2221/033* (2013.01); *H04L 63/1433* (2013.01)

(56) References Cited

U.S. PATENT DOCUMENTS

| | | | |
|---|---|---|---|
| 8,793,201 B1* | 7/2014 | Wang | G06F 16/258 |
| | | | 706/13 |
| 9,100,669 B2 | 8/2015 | Feng et al. | |
| 9,355,067 B1* | 5/2016 | Monga | G06N 7/005 |
| 10,019,740 B2 | 7/2018 | Simantov et al. | |
| 10,121,108 B2 | 11/2018 | Miserendino et al. | |
| 11,138,617 B2* | 10/2021 | Litmanovich | H04L 67/22 |
| 11,182,691 B1* | 11/2021 | Zhang | G06N 20/00 |
| 11,271,939 B2* | 3/2022 | Apostolopoulos | G06N 7/005 |
| 11,310,268 B2* | 4/2022 | Bowditch | G06N 20/00 |
| 2004/0220892 A1 | 11/2004 | Cohen et al. | |
| 2006/0288038 A1 | 12/2006 | Zheng et al. | |
| 2007/0282780 A1 | 12/2007 | Regier et al. | |
| 2008/0103996 A1 | 5/2008 | Forman et al. | |
| 2008/0154820 A1* | 6/2008 | Kirshenbaum | G06N 3/126 |
| | | | 706/20 |
| 2010/0217732 A1 | 8/2010 | Yang et al. | |
| 2010/0220906 A1* | 9/2010 | Abramoff | G06K 9/6231 |
| | | | 382/165 |
| 2010/0293117 A1 | 11/2010 | Xu | |
| 2012/0166366 A1* | 6/2012 | Zhou | G06N 20/00 |
| | | | 706/59 |
| 2012/0300980 A1 | 11/2012 | Yokono | |
| 2012/0310864 A1 | 12/2012 | Chakraborty et al. | |
| 2013/0080359 A1 | 3/2013 | Will et al. | |
| 2014/0090061 A1 | 3/2014 | Avasarala et al. | |
| 2014/0187177 A1 | 7/2014 | Sridhara et al. | |
| 2014/0358828 A1 | 12/2014 | Phillipps et al. | |
| 2015/0067857 A1 | 3/2015 | Symons et al. | |
| 2015/0135262 A1 | 5/2015 | Porat et al. | |
| 2015/0154353 A1 | 6/2015 | Xiang et al. | |
| 2015/0178639 A1* | 6/2015 | Martin | G16B 40/00 |
| | | | 706/12 |
| 2015/0235079 A1 | 8/2015 | Yokono | |
| 2015/0324686 A1* | 11/2015 | Julian | G06N 3/08 |
| | | | 706/25 |
| 2016/0063397 A1 | 3/2016 | Ylipaavalniemi et al. | |
| 2016/0217349 A1 | 7/2016 | Hua et al. | |
| 2016/0299785 A1 | 10/2016 | Anghel et al. | |
| 2016/0335435 A1 | 11/2016 | Schmidtler et al. | |
| 2016/0342903 A1 | 11/2016 | Shumpert | |
| 2016/0379135 A1 | 12/2016 | Shteingart et al. | |
| 2019/0336097 A1 | 11/2019 | Bregman-Amitai et al. | |

FOREIGN PATENT DOCUMENTS

| | | |
|---|---|---|
| JP | 2012-027710 A | 2/2012 |
| JP | 2014-504399 A | 2/2014 |
| JP | 2015-079504 A | 4/2015 |
| WO | 2005/091214 A1 | 9/2005 |

OTHER PUBLICATIONS

Iker Burguera et al: "Crowdroid" Security and Privacy in Smartphones and Mobile Devices, ACM, 2 Penn Plaza, Suite 701 New York NY 10121-0701 USA, Oct. 17, 2011 (Oct. 17, 2011), pp. 15-26.
International Preliminary Report on Patentability received for PCT Patent Application No. PCT/US2016/036408, dated Feb. 15, 2018, 12 pages.
International Search Report and the Written Opinion issued in PCT/US2016/036408 dated Sep. 13, 2016.
Supplementary European Search Report for Application No. 16833453.0 (PCT/US2016/036408) dated Jan. 22, 2019, 1 page.

\* cited by examiner

CLASSIFIER TEST STATISTICS

OVERALL PERFORMANCE SCORE*

| CURRENT CLASSIFIER | RETRAINED CLASSIFIER |
|---|---|
| 0.926 | 0.944 |

HECTOR RECOMMENDS ACCEPTING THE RETRAINED CLASSIFIER.

CHANGE IN THRESHOLD-DEPENDENT METRICS

☑ USE RECOMMENDED THRESHOLDS

CURRENT CLASSIFIER REC.    RETRAINED CLASSIFIER REC.
0 10 20 30 40 50 60 70 80 90 100    0 10 20 30 40 50 60 70 80 90 100

| SOURCE | ± FP% | ± FN% | ± PERF SCORE |
|---|---|---|---|
| ORIGINAL TEST | -0.01 | +0.09 | -0.001 |
| IN-SITU HOLDOUT | -40.48 | +0.29 | +0.345 |
| COMBINED | -1.86 | +0.09 | +0.017 |

SYSTEM AND METHOD FOR MACHINE LEARNING MODEL DETERMINATION AND MALWARE IDENTIFICATION

CROSS REFERENCE TO RELATED APPLICATIONS

This application is a continuation of U.S. patent application Ser. No. 16/180,790, filed Nov. 5, 2018, which is a continuation of U.S. patent application Ser. No. 15/176,784, filed Jun. 8, 2016, now U.S. Pat. No. 10,121,108, which claims benefit of U.S. Patent Application No. 62/199,390, filed Jul. 31, 2015, each of which is hereby incorporated by reference in their entirety.

BACKGROUND

Machine learning is a technique that uses the high speed processing power of modern computers to execute algorithms to learn predictors of behavior or characteristics of data. Machine learning techniques may execute algorithms on a set of training samples (a training set) with a known class or label, such as a set of files known to exhibit malicious or benign behaviors, to learn characteristics that will predict the behavior or characteristics of unknown things, such as whether unknown files are malicious or benign.

Many current approaches to machine learning use algorithms that require a static training set. Such machine learning approaches using algorithms that require a static training set (such as those based on decision trees) assume that all training samples are available at training time. There exists a class of supervised machine learning algorithms known as on-line or continuous learning algorithms that update the model on each new sample. However, these algorithms assume each new sample will be classified by an expert user.

A relevant machine learning method is batch mode active learning (BMAL). BMAL constructs a new classifier that is retrained based on a batch of new samples in an optionally repeatable process. BMAL, however focuses on the selection of unlabeled samples to present to the user for adjudication. BMAL: conducts repeated learning until some objective performance criteria is met. Additionally, BMAL does not cover the case where the training data is split between multiple locations where original training and test data must be sent to the user where new samples are added.

Other relevant prior art methods are described in the following patents and published applications. For example, U.S. Pat. No. 6,513,025 ("the '025 patent"), entitled "Multistage Machine Learning Process," involves partitioning of training sets by time intervals and generating multiple classifiers (one for each interval). Time intervals are cyclic/periodic (fixed frequency) in the preferred embodiment. The '025 patent leverages dependability models (method for selecting which classifier model to use based on the system input) to determine which classifier to use. In addition, the classifier update and training sample addition methods in this patent are continuous. The '025 patent is also limited to telecommunications network lines.

U.S. Pre-Grant Publication No. 20150067857 ("the '857 publication") is directed towards an "In-situ Trainable Intrusion Detection System." The described system in the '857 publication is based on semi-supervised learning (uses some unlabeled samples). Learning is based on network traffic patterns (netflow or other flow metadata) not files. The '857 publication uses a Laplacian Regularized Least Squares learner and does not include a method for allowing users to select between classifiers or view analysis of performance of multiple classifiers. The '857 publication also only uses in-situ samples (samples from the client enterprise).

U.S. Pre-Grant Publication No. 20100293117 ("the '117 publication") entitled "Method and System for Facilitating Batch Mode Active Learning," discloses a method for selecting documents to include in a training set based on an estimate of the "reward" gained by including each sample in the training set (estimate of performance increase). The reward can be based on an uncertainty associated with an unlabeled document or document length. The '117 publication does not disclose detecting malicious software or files. U.S. Pre-Grant Publication No. 20120310864 ("the '864 publication"), "Adaptive Batch Mode Active Learning for Evolving a Classifier," focuses on applying this technique to image, audio, and text data (not binary files and not for the purpose of malware detection). Moreover, the '864 publication requires the definition of a stop criterion which is typically based on a predetermined desired level of performance. Importantly, the '864 publication method lacks accommodations for in-situ learning such as the potential need to provide a partial training corpus, expressing that corpus as feature vectors instead of maintaining the full sample, etc.

Existing machine learning techniques disclose learning algorithms and processes but do not cover the method for augmenting or retraining a classifier based on data not accessible to the original trainer. Existing machine learning techniques do not enable training on data samples that an end user does not wish to disclose to a 3rd-party which was originally responsible for conducting the machine learning.

Additionally, prior art malware sensors have an inherent problem in which each instance of a malware sensor (anti-virus, IDS, etc.) is identical provided their signatures or rule sets are kept up-to-date. In such instances, since each deployment of a cyber-defense sensor is identical, a bad actor or malware author may acquire the sensor and then test and alter their malware until it is not detected. This would make all such sensors vulnerable.

SUMMARY

Described herein are embodiments that overcome the disadvantages of the prior art. These and other advantages are provided by a method for batched, supervised, in-situ machine learning classifier retraining for malware identification and model heterogeneity. The method produces a parent classifier model in one location and providing it to one or more in-situ retraining system or systems in a different location or locations, adjudicates the class determination of the parent classifier over the plurality of the samples evaluated by the in-situ retraining system or systems, determines a minimum number of adjudicated samples required to initiate the in-situ retraining process, creates a new training and test set using samples from one or more in-situ systems, blends a feature vector representation of the in-situ training and test sets with a feature vector representation of the parent training and test sets, conducts machine learning over the blended training set, evaluates the new and parent models using the blended test set and additional unlabeled samples, and elects whether to replace the parent classifier with the retrained version.

DETAILED DESCRIPTION

Figure 1:
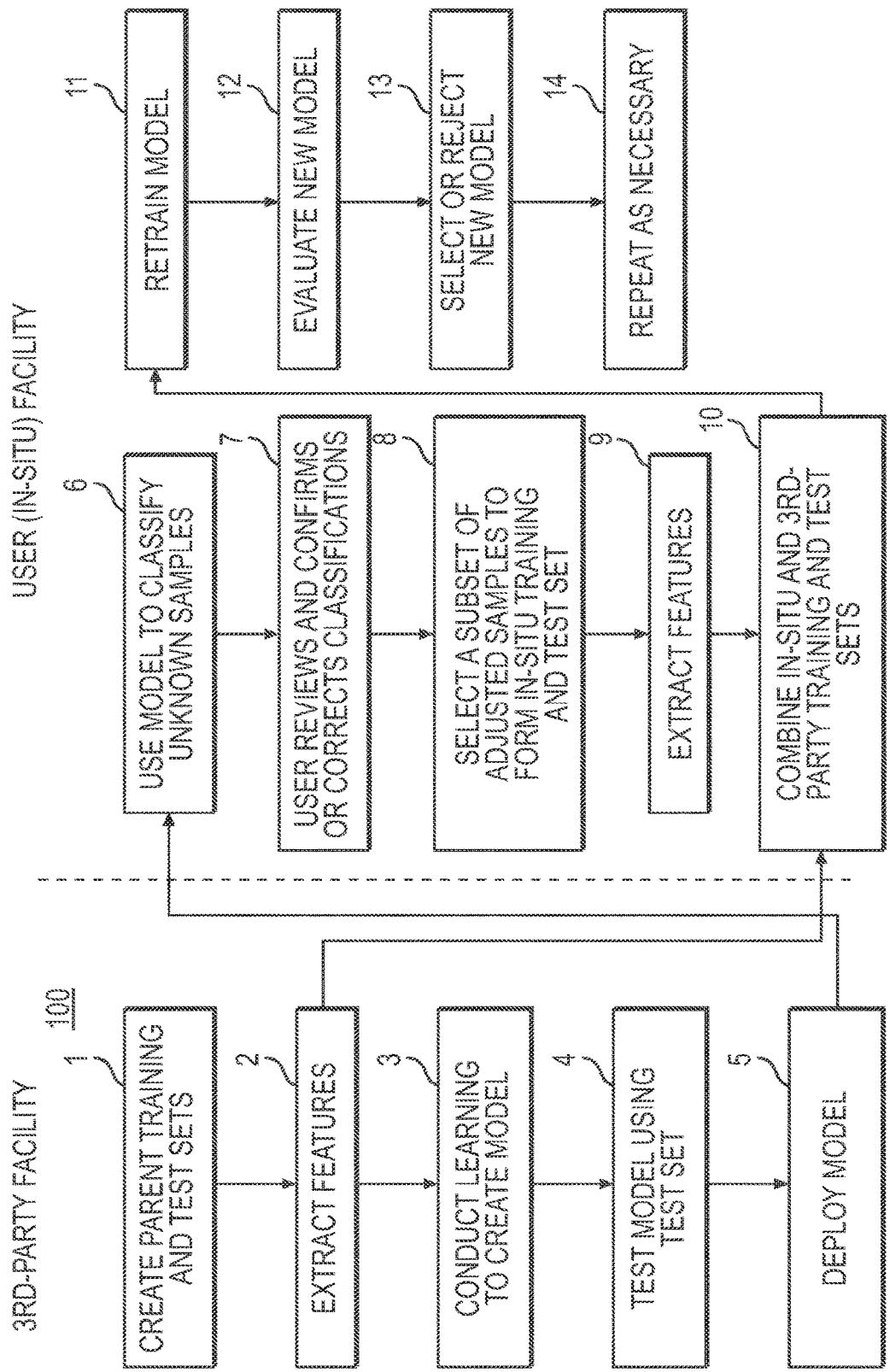
FIG. 1 shows an exemplary embodiment of a method for in-situ classifier retraining for malware identification and model heterogeneity, according to one aspect of this disclosure.

Described herein are embodiments of a system and method for in-situ classifier retraining for malware identification and model heterogeneity. Embodiments overcome the problems described above. For example, embodiments provide for the augmentation of an existing machine learning-based classification model based on user-driven confirmation or correction of the existing model's class prediction and in-situ retraining. In-situ herein refers to conducting the machine learning at the physical location of an installed instance of a classifier. Indeed, when applied across Multiple instances, embodiments allow each instance to create a model unique to that instance.

A preferred embodiment is applied to the problem of determining if unknown/untrusted software or software application files are either benign or malicious. The child classifiers created through this method are not only unique but maintain or improve the statistical performance of the parent classifier. In particular, embodiments have been demonstrated to reduce false positive rates of software classification. Embodiments are designed to allow retraining of the parent classifier using a combination of the original training set and a supplemental training set, referred to as the in-situ training set. The in-situ training set is generated within a local instance's environment, eliminating the need for potentially sensitive or proprietary data to be shared with any other party—including the party which constructed the parent classifier. In embodiments, users, however, may elect to form trusted relationships with other users and securely share some or all of their in-situ training data using an abstraction of the potentially sensitive or proprietary data.

The embodiments described herein include many significant differences over the prior art. As opposed to prior art described above, embodiments may require recurring batching at non-fixed intervals of new samples prior to retraining but does not assume every new sample will be classified by an expert user or otherwise be eligible for inclusion in a retraining batch. These differences make embodiments of the system and method distinct from the class of on-line or continuous learning techniques.

Additionally, as opposed to BMAL, embodiments allow a user to choose samples at will to adjudicate. Likewise, in embodiments a user determines the number of cycles of retraining rather than using an objective stop criteria. Additionally, embodiments cover the case where the training data is split between multiple locations where original training and test data must be sent to the user where new samples are added.

Further, as opposed to the '025 patent, the in-situ learning of the embodiments described herein involves the complete replacement of the current classifier, not the subdivision of the input space and continued use of the older models. Likewise, the embodiments described herein is user-driven batch learning (not all events are included in the additional learning). Alternatively, in another aspect of this disclosure, the batch learning may be driven by an automated process. Contrary to the '857 publication, in-situ embodiments described herein may be fully supervised, as opposed to Laplacian Regularized Least Squares learners which are semi-supervised. While unsupervised and semi-supervised learning may be implemented in aspects of the system, supervised learning is preferred because, for example, supervised learning may result in a classification determination of an unknown sample moreover, embodiments describe herein may use a mix of samples from the client enterprise and those provided by the manufacturer. As opposed to the '117 publication, embodiments utilize all labeled samples. As distinguished from the '864 publication, embodiments have a trivial stop criterion (single pass with user making the decision on whether the performance is adequate) which does not require the calculation of any distance function between the batch of unlabeled data and the remaining unlabeled data and does not select a batch of training elements based on an evaluation of an objective function.

Embodiments allow users to retrain machine learning-based classifiers in-situ to the users' deployment of the classification software/hardware. The retraining allows improvement of the overall classifier performance (e.g., reducing false positives and false negatives). The in-situ retaining also allows the creation or production of a unique version of the classification model. That version may be unique to that instance and unique for that user. By having a tailored model the user assures that a malware producer will not be able to test the malware against the detection technology prior to attempting to compromise the user's network. In addition, the tailoring may be used to create models biased toward particular types of malware that are proprietary or sensitive and, therefore, unavailable to the creator of the parent classifier model. In some embodiments, sharing may be facilitated amongst multiple users by using abstracted sample representations that completely obscure the sample content but still allow others to leverage the sample for retraining. Furthermore, users may elect to share models trained in one location with other locations in their network or even among trusted partners. Additionally, or alternatively, models generated as a result of in-situ retraining may be exported to or imported from trusted partners.

Figure 2:
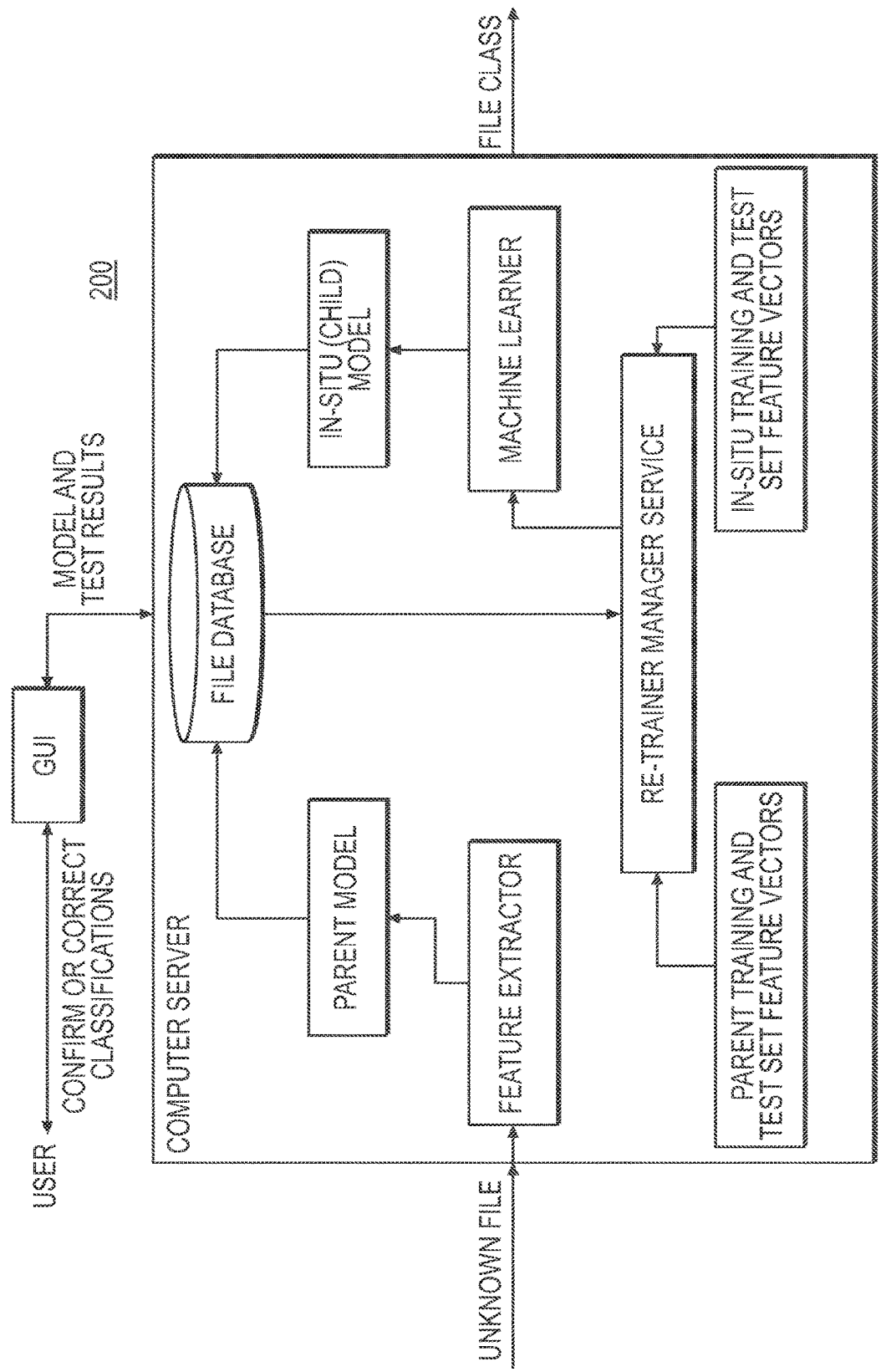
FIG. 2 shows an exemplary architecture of a system for in-situ classifier retraining for malware identification and model heterogeneity, according to one aspect of this disclosure.

With reference now to FIG. 1, shown is exemplary embodiment of a method 100 for in-situ classifier retraining for malware identification and model heterogeneity. As shown, embodiments of method 100 are described with respect to a fourteen (14) step process. Method 100 may be implemented in a software/hardware architecture as shown in FIG. 2. In embodiments, the in-situ retraining process occurs with respect to two physically separated locations, denoted as "3rd-Party Facility" and "User (In-situ) Facility" in FIG. 1. A third-party (e.g., an enterprise that sells malware detection hardware/software) builds an initial version of the classifier (see blocks 1-5), known as the base classifier. This base classifier is constructed using a supervised machine learning algorithm, such as decision trees, support vector machines, k-nearest neighbors, artificial neural networks, Bayesian networks, etc. The third-party builds the parent training and test sets, block 1. The learning is conducted over a training set composed of samples of identical type and covering all desired classes. In an embodiment only two classes are used, malicious and benign. The samples may include computer executable program files (PE32, PE32+, ELF, DMG, etc.) and files used by common computer software (Microsoft Word, Microsoft Excel, PDF, etc.). Third party extracts features (e.g., features more likely to be present in malicious and/or benign files) from the training set (e.g., as extracted feature vectors), block 2, conducts the learning to create a model using a supervised machine learning algorithm, block 3 and tests the model using the test set, block 4. Such a classifier may be built according to methods described in U.S. patent application Ser. No. 14/038,682 (published as US20140090061), which is hereby incorporated by reference. One or more classifiers may be created to cover the variety of file types.

Once the third-party creates the classifier, the classifier is sent/deployed to the user facility (e.g., a customer) as a classifier instance, block 5. Such deployment 5 may be part of multiple user facility (e.g., multiple customer), multiple instance deployment. A user facility houses system hardware and software, e.g., such as shown in FIG. 2. As used herein, the term user facility refers to an entire user's enterprise which may include multiple physical locations with one or more in-situ retraining systems deployed at some or all of the enterprise's physical locations. In addition to the classifier model, the third-party also delivers extracted feature vectors from the training and test samples. Feature vectors are a summary representation of the sample based on a set of properties or attributes of the sample, known as features. A feature vector is an abstracted representation of the sample that obfuscates the sample content and facilitates model training. Features may include such things as file header properties, existence of certain parts or components of a file, consecutive binary sequences known as n-grams, computations over the binary representation such as entropy, etc. An important feature of embodiments described herein is the transfer of this generalized representation of the original training and test sets to the user facility.

With continuing reference to FIG. 1, the original third-party created base classifier becomes the first parent classifier in the repeatable in-situ process. Method 100 uses this base classifier to evaluate unknown content on the user network predicting a class (e.g., benign or malicious) for each sample, block 6. In an embodiment, a user may use system graphical user interface (GUI) to inspect some or all of the predicted classes and determines whether the sample is truly benign or malicious (e.g., confirms or corrects classifications), block 7. In another aspect of this disclosure, the in-situ retraining system may inspect, without human intervention, some or all of the predicted classes and determine whether the sample is benign or malicious (e.g., confirms or corrects classifications). The act of confirming or correcting the classification is called adjudication. In an embodiment, a retrain manager (e.g., instantiated as a retrain manager service) monitors the user's adjudication activity and determines when a sufficient number of in-situ samples have been adjudicated.

In embodiments, there are a required threshold number of adjudicated events that must be accumulated before a retrain may occur. When the user exceeds the required threshold number of adjudicated events the user may elect to conduct a retrain. Adjudicated samples may be stored on one or more in-situ retraining systems. Information about adjudicated samples may also be acquired through sharing amongst other system users provided a trust relationship exists. When the user initiates a retrain, the retrain manager creates a training and test set from the adjudicated in-situ samples, block 8. Alternatively, the in-situ retraining system may, without human intervention, initiate a retrain. The training and test set may be selected from a subset of the adjudicated samples. Retrain manager may also extract feature vectors from both retrain training and test sets, block 9. Method 100 may then blend these in-situ feature vectors with the parent/base classifier's feature vectors (and feature vectors from sharing partners, if any), block 10 in a separate mode, an embodiment may use a subset of the parent/base classifier's feature vectors (and those from sharing partners) without any additional in-situ samples. This subset may be selected randomly from the full set of available feature vectors. In one aspect, a blending implementation, known as an additive method, the in-situ sample feature vectors may be added to the parent classifier feature vectors. In another aspect, in a second blending implementation, known as a replacement method, the in-situ sample feature vectors may replace an equal number of the parent classifier feature vectors. In another aspect, in a third blending implementation, known as a hybrid method, the in-situ sample feature vectors may be added to a subset of the parent classifier feature vectors. This may create a training set larger than parent set but smaller than one created by the additive method. Using a hybrid method of blending may allow the user to limit the influence of the in-situ samples on the new classification model. A new classification model is trained by the machine learner using the same machine learning algorithm used to create the parent/base classifier, block 11. Once a new classifier is created it is evaluated against the retrain test set, which includes sample feature vectors from both the third-party (base classifier test set feature vectors) and the user facility (retrain test set feature vectors), block 12. Evaluation 12 occurs against both labeled and unlabeled samples not included in the training set. A system GUI may be provided to aid the user in conducting the evaluation. Embodiments may also provide an automated recommendation, e.g., provided by the retraining manager, as to which classifier is better (see, e.g., FIGS. 3 and 4).

With continuing reference to FIG. 1, at the end of the evaluation period, in embodiments the user elects to either accept the new classifier and replace the current parent classifier or reject it and keep the parent classifier, block 13. In another aspect of this disclosure, the in-situ retraining system, without human intervention, may accept the new classifier and replace the current parent classifier or reject it and keep the parent classifier. In either case, the process may be repeated, e.g. at the user's discretion or by the in-situ retraining system, block 14. Once a new in-situ classifier is accepted it becomes the parent/base classifier for the next round of in-situ retraining 100. The user can further elect to deploy the retrained classifier model to ail in-situ retraining systems throughout their enterprise thereby replacing each system's parent classifier with the new retrained classifier. In another aspect of this disclosure, the in-situ retraining system, without human intervention, may deploy the retrained classifier model to all in-situ retraining systems throughout their enterprise thereby replacing each system's parent classifier with the new retrained classifier.

In embodiments, successive retraining will use the previous round's training and test set as a basis for augmentation. System for in-situ classifier retraining for malware identification and model heterogeneity may optionally elect to "anchor" the retraining to the original 3rd-party base classifier and associated training and test set. When retraining in anchor mode, the original base classifier, original base classifier training, and original base classifier test set or subsets thereof are used for all subsequent anchored retrainings.

With reference again to FIG. 2, shown is an exemplary architecture of a system 200 for in-situ classifier retraining for malware identification and model heterogeneity. System 200 may be implemented by one or more computer servers, including blade servers or chained servers. Server may host file database, into which information about known, unknown and classified files is stored. Server also may host parent model, parent training and test set feature vectors, in-situ model and in-situ training and test set feature vectors. Retraining manager, instantiated as a service, may be run on server and may create in-situ models, using machine learner (e.g., machine learning service executing machine learning algorithms), and in-situ training and test set feature vectors. As discussed above, retraining manager may replace parent model and parent training and test set feature vectors with in-situ models and in-situ training and test set feature vectors, which then become new parent model and parent training and test set feature vectors, respectively. Alternatively, in an anchored retraining, the original (or the then existent, at the point anchored training is implemented), parent model, training and test set feature vectors remain in parallel with in-situ models and in-situ training and test set feature vectors. System 200 may use feature extractor (e.g., a feature extractor service) on server to extract features from previously classified files and create in-situ feature vectors. Feature extractor may also extract features from unknown files, received as input by server, for classification. Server may classify files, using machine learner and in-situ model, and output file classifications.

System 200 may also include a GUI to enable display of in-situ models, parent models, test results and classifications, output by server, to user. The GUI may also enable entry and receipt of user inputs that, e.g., confirm or correct classifications, elect to retrain, elect to accept a new in-situ model, etc., as described herein. In embodiments, server receives user inputs entered through GUI and executes steps as described herein. In another aspect of this disclosure, the server receives inputs generated by the in-situ retraining system.

Figure 3:
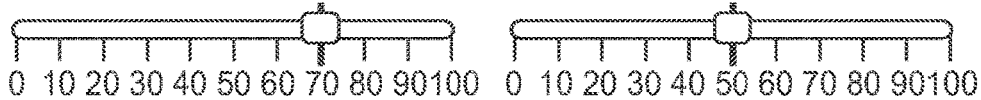
FIG. 3 shows a screen shot of an exemplary GUI (graphical user interface), according to one aspect of this disclosure.

With reference now to FIG. 3, shown is a screen shot of an exemplary GUI 300 according to an embodiment of system 200. GUI 300 illustrates an in-situ retraining evaluation screen shot showing analysis of the in-situ retrained model on labeled samples. As shown, the GUI 300 may display a comparison of classification results of the in-situ retrained model versus classification results of the base or parent model. GUI 300 shows a comparison of classification scores, which may be based or calculated on a formula that counts and weights false negatives and false positives. GUI 300 shows the percentage of false negatives and false positives for the base model, the improvement from the in-situ model and a combined model improvement (i.e., improvement from combining in-situ and base models).

Figure 4:
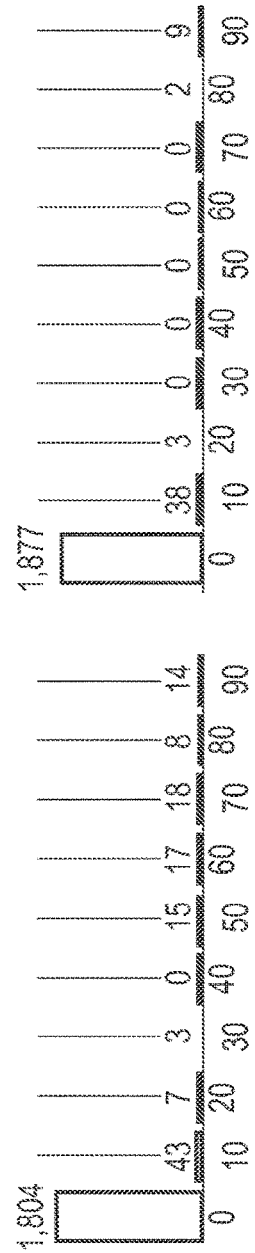
FIG. 4 shows a second screen shot of an exemplary GUI, according to one aspect of this disclosure.

With reference now to FIG. 4, shown is another screen shot of an exemplary GUI 400 according to an embodiment of system 200. GUI 400 illustrates an in-situ retraining evaluation screen shot showing analysis on unlabeled samples. Specifically, GUI 400 includes a graph illustrating classification changes using a new in-situ model versus a base model. GUI 400 also includes a bar graph that illustrates the number of files classified with what percentage confidence or likelihood of being malicious as determined by in-situ and base classifier (e.g., 1877 classified by in-situ as 0% likely to be malicious) The bar graph illustrates the in-situ classifier is either highly confident non malicious (0-10%) or highly confident malicious (80-90%), whereas the base classifier exhibits a greater number of files classified with levels of confidence outside these extremes (e.g., 20-70%) and, therefore, less useful.

Figure 5:
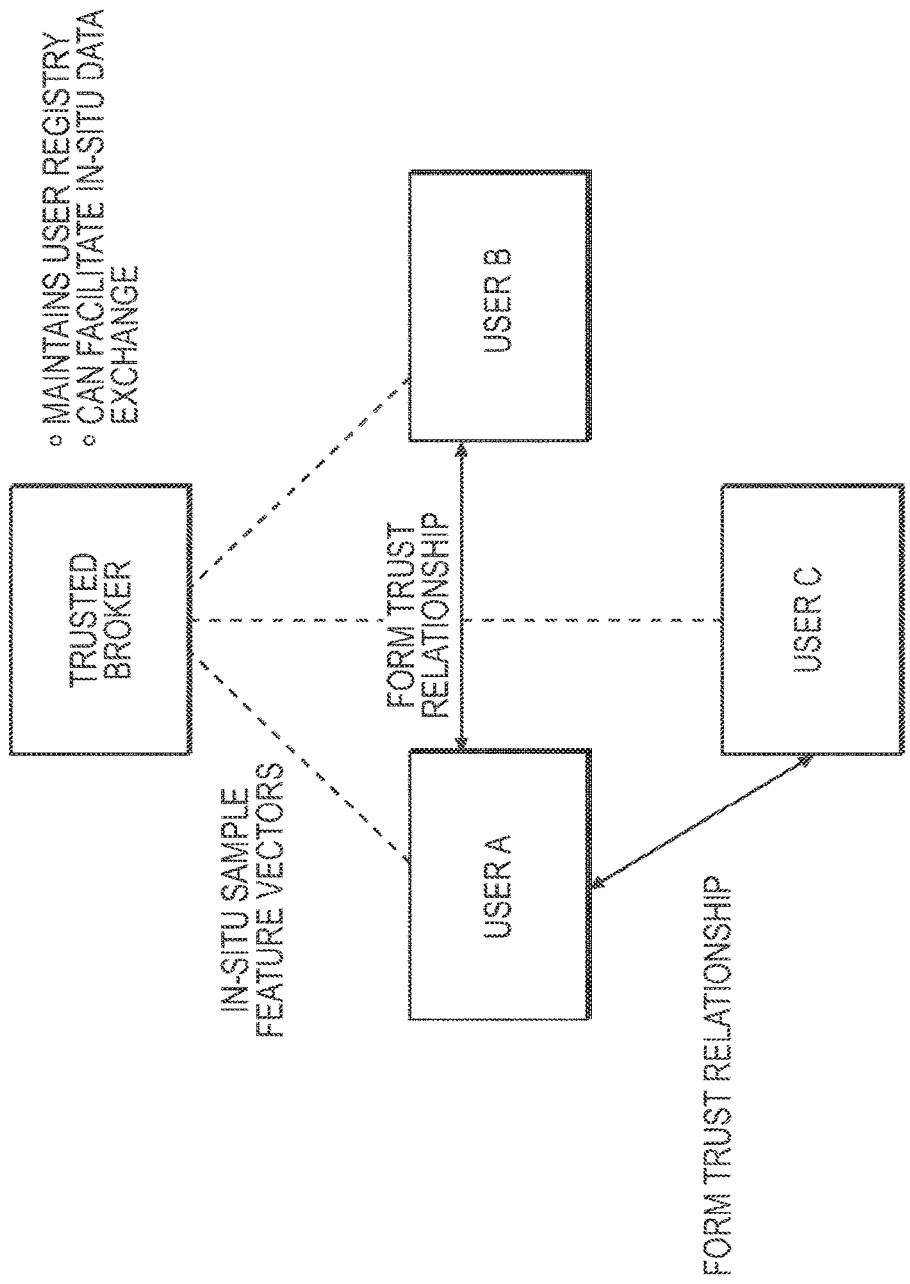
FIG. 5 shows a trust relationship scenario for sharing feature vectors, according to one aspect of this disclosure.

With reference now to FIG. 5, shown is an illustration of a trust relationship scenario for sharing feature vectors. In embodiments, secure sharing of adjudicated sample feature vectors among multiple users is possible. To share adjudicated sample feature vectors, users must first elect to enter into a trust relationship with each other. A trusted broker, most likely but not necessarily the third-party facility that created the base classifier, may facilitate the transfer of sample feature vectors by receiving the shared data from the originator and forwarding it to the receiver. Alternatively, the participants in the trust relationship may directly transmit the data to each other in a peer-to-peer fashion. The data is typically encrypted during transmission between participants in the trust relationship. Shown in FIG. 5, is a scenario in which user A has a trust relationship with both user B and user C, but user B and user C have not entered into a trust relationship with each other. In this scenario, user B may therefore use in-situ data (feature vectors) user A has chosen to share but not data user C has chosen to share user A may use data from both user B and user C. By only sharing feature vectors, users may protect their confidential or sensitive file data from the other users with which they share.

When shared data is used in the construction of in-situ training and test sets, the user may elect to prioritize the inclusion of the shared data relative to their own and to each provider of the shared feature vectors. Each source prioritization is converted to a percent of the training and test set that will be taken from that source's adjudicated samples.

Embodiments of the system and method for in-situ classifier retraining for malware identification and model heterogeneity, as described, herein overcome a number of defects and disadvantages of the prior art. For example, embodiments described herein address the challenge of being able to train on data samples for which the end user does not wish to disclose to the 3rd-party which is responsible for conducting the machine learning. An example of this scenario is the identification of malicious pdf files. The third party may have a corpus of malicious and benign pdfs to train a classifier, but that classifier may produce an unacceptable number of false positives when applied to a user's pdf files. The user, however, does not wish to share their pdf files that are being incorrectly marked because the pdf files may contain sensitive or proprietary information. By allowing the user to conduct retraining in-situ the user gets the benefit of having their data added to the training set without the cost or risk of providing their samples to the third-party or other users. In another aspect of this disclosure, the in-situ retraining system may add data to the training set without incurring the cost or risk of providing their samples to the third-party or other users.

In addition, embodiments of the system and method for in-situ classifier retraining for malware identification and model heterogeneity solve the problem in cyber defense where each instance of a malware sensor (anti-virus, IDS, etc.) is identical (assuming each instance's signatures are kept up-to-date). Since each deployment of a cyber-defense sensor is identical, and a bad actor or malware author may acquire the sensor, it is possible for the bad actor to test/alter their malware until it is not detected. In-situ training allows each instance of a sensor to tailor itself on data not available to anyone but the local user; this method effectively guarantees all in-situ trained classifier models are unique. In other words, the set of all malware detection models is heterogeneous instead of homogeneous. Bad actors will no longer be able to rely on pre-testing their malware and incur greater risk of discovery across the community of users.

Embodiments of the system and method for in-situ classifier retraining for malware identification and model heterogeneity also address the issue of secure sharing of potentially sensitive or proprietary information for the purpose of machine learning. By establishing trust relationships among users in which they share the sample feature vectors, and not the samples themselves, each user gains the benefit of the others' work without having to expose the sensitive data.

Embodiments contain several innovative concepts. Embodiments use machine learning and in-situ retraining to produce a unique classification model for each user. The implementation of in-situ learning described here is based on a combination of third-party and in-situ datasets allowing the user the benefits of tailoring without requiring the user to release data to the third-party. Due to the blending of datasets and a tightly controlled and automated machine learning process, the user is less prone to unintentional errors introduced by poor machine learning methods that could result in poor performance. Embodiments of the system allow the user to define which samples are made eligible for retraining rather than relying on an automated analysis which may not reflect the user's priorities.

Testing of embodiments has demonstrated over all reductions in false positive rates on previously misclassified in-situ samples in excess of 99% with overall false positive performance improvements on a broad set of samples in excess of 30%. These improvements are achieved with little to no increase in false negative rates. In addition, test results have also shown that using different data to retrain classifiers results in different classification behaviors on the same sample.

A summary of an in-situ process including the formation of the base set prior to in-situ, according to embodiments described herein follows below (e.g., steps 1-5 occur in the 3rd-party facility while steps 6-14 occur in the user facility):
1. Create base training and test sets;
2. Extract features;
3. Conduct learning to create model;
4. Test model using test set;
5. Deploy model;
6. Use model to classify unknown samples;
7. User or in-situ retraining system reviews and confirms or corrects classifications;
8. Select a subset of adjudicated samples to form in-situ training and test set based on source prioritization;
9. Extract features;
10. Combine in-situ and 3rd-party training and test sets or subsets thereof;
11. Retrain model;
12. Evaluate new model; Deploy or reject new model; and
14. Repeat steps 6-14 as necessary.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method comprising:
receiving information indicating a first plurality of attributes associated with a first plurality of files for machine learning training;
determining, based on the information, a plurality of classifications for a second plurality of files;
based on adjudicating one or more of the plurality of classifications, determining a second plurality of attributes associated with the second plurality of files;
determining, based on training and using at least a portion of the first plurality of attributes and at least a portion of the second plurality of attributes, a machine learning model; and
determining, based on the machine learning model, that a file comprises malicious content.

2. The method of claim 1, wherein the first plurality of attributes was extracted from the first plurality of files, wherein the first plurality of attributes comprises at least one of a file header property, a component of a file, or a binary sequence, and
wherein the second plurality of attributes was extracted from the second plurality of files wherein the second plurality of attributes comprises at least one of a file header property, a component of a file, or a binary sequence.

3. The method of claim 1, wherein the training is based on a machine learning algorithm, and wherein the machine learning algorithm comprises a decision tree, support vector machine, a k-nearest neighbor algorithm, an artificial neural network, or a Bayesian network.

4. The method of claim 1, wherein each classification of the plurality of classifications comprises at least one of malicious content or benign content.

5. The method of claim 1, wherein the adjudicating comprises:
confirming classifications of the plurality of classifications that are correct; and
adjusting classifications of the plurality of classifications that are not correct.

6. The method of claim 1, wherein the adjudicating indicates an accuracy of the machine learning model at determining the plurality of classifications and relevant attributes for determining the plurality of classifications.

7. The method of claim 1, wherein the training is triggered based on adjudicating a threshold number of classifications of the plurality of classifications.

8. The method of claim 1, wherein the second plurality of files are unique to an organization.

9. A device comprising:
one or more processors; and
memory storing instructions that, when executed by the one or more processors, cause the device to:
receive information indicating a first plurality of attributes associated with a first plurality of files for machine learning training;
determine, based on the information, a plurality of classifications for a second plurality of files;
based on adjudicating one or more of the plurality of classifications, determine a second plurality of attributes associated with the second plurality of files;
determine, based on training and using at least a portion of the first plurality of attributes and at least a portion of the second plurality of attributes, a machine learning model; and
determine, based on the machine learning model, that a file comprises malicious content.

10. The device of claim 9, wherein the first plurality of attributes was extracted from the first plurality of files, wherein the first plurality of attributes comprises at least one of a file header property, a component of a file, or a binary sequence, and
wherein the second plurality of attributes was extracted from the second plurality of files wherein the second plurality of attributes comprises at least one of a file header property, a component of a file, or a binary sequence.

11. The device of claim 9, wherein the training is based on a machine learning algorithm, and wherein the machine learning algorithm comprises a decision tree, support vector machine, a k-nearest neighbor algorithm, an artificial neural network, or a Bayesian network.

12. The device of claim 9, wherein each classification of the plurality of classifications comprises at least one of malicious content or benign content.

13. The device of claim 9, wherein the adjudicating comprises:
confirming classifications of the plurality of classifications that are correct; and
adjusting classifications of the plurality of classifications that are not correct.

14. The device of claim 9, wherein the adjudicating indicates an accuracy of the machine learning model at determining the plurality of classifications and relevant attributes for determining the plurality of classifications.

15. The device of claim 9, wherein the training is triggered based on adjudicating a threshold number of classifications of the plurality of classifications.

16. The device of claim 9, wherein the second plurality of files are unique to an organization.

17. A non-transitory computer-readable medium storing instructions that, when executed, cause:
receiving information indicating a first plurality of attributes associated with a first plurality of files for machine learning training;
determining, based on the information, a plurality of classifications for a second plurality of files;
based on adjudicating one or more of the plurality of classifications, determining a second plurality of attributes associated with the second plurality of files;
determining, based on training and using at least a portion of the first plurality of attributes and at least a portion of the second plurality of attributes, a machine learning model; and
determining, based on the machine learning model, that a file comprises malicious content.

18. The non-transitory computer-readable medium of claim 17, wherein the first plurality of attributes was extracted from the first plurality of files, wherein the first plurality of attributes comprises at least one of a file header property, a component of a file, or a binary sequence, and
wherein the second plurality of attributes was extracted from the second plurality of files wherein the second plurality of attributes comprises at least one of a file header property, a component of a file or a binary sequence.

19. The non-transitory computer-readable medium of claim 17, wherein the adjudicating comprises:
confirming classifications of the plurality of classifications that are correct; and
adjusting classifications of the plurality of classifications that are not correct.

20. The non-transitory computer-readable medium of claim 17, wherein the adjudicating indicates an accuracy of the machine learning model at determining the plurality of classifications and relevant attributes for determining the plurality of classifications.

21. A system comprising:
a first computing device configured to:
receive information indicating a first plurality of attributes associated with a first plurality of files for machine learning training;
determine, based on the information, a plurality of classifications for a second plurality of files;
based on adjudicating one or more of the plurality of classifications, determine a second plurality of attributes associated with the second plurality of files;
determine, based on training and using at least a portion of the first plurality of attributes and at least a portion of the second plurality of attributes, a machine learning model; and
determine, based on the machine learning model, that a file comprises malicious content; and
a second computing device configured to:
send, to the first computing device, the information.

22. The system of claim 21, wherein the first plurality of attributes was extracted from the first plurality of files, wherein the first plurality of attributes comprises at least one of a file header property, a component of a file, or a binary sequence, and
wherein the second plurality of attributes was extracted from the second plurality of files wherein the second plurality of attributes comprises at least one of a file header property, a component of a file, or a binary sequence.

23. The system of claim 21, wherein the training is based on a machine learning algorithm, and wherein the machine learning algorithm comprises a decision tree, support vector machine, a k-nearest neighbor algorithm, an artificial neural network, or a Bayesian network.

24. The system of claim 21, wherein each classification of the plurality of classifications comprises at least one of malicious content or benign content.

25. The system of claim 21, wherein the adjudicating comprises:
confirming classifications of the plurality of classifications that are correct; and
adjusting classifications of the plurality of classifications that are not correct.

26. The system of claim 21, wherein the adjudicating indicates an accuracy of the machine learning model at determining the plurality of classifications and relevant attributes for determining the plurality of classifications.

27. The system of claim 21, wherein the training is triggered based on adjudicating a threshold number of classifications of the plurality of classifications.

28. The system of claim 21, wherein the second plurality of files are unique to an organization.

* * * * *